(12) United States Patent
Liu et al.

(10) Patent No.: US 10,834,016 B2
(45) Date of Patent: Nov. 10, 2020

(54) COMMUNICATIONS METHOD AND DEVICE (71) Applicant: HUAWEI TECHNOLOGIES CO., LTD., Shenzhen (CN)

(72) Inventors: Yalin Liu, Shanghai (CN); Jun Zhang, Shenzhen (CN); Xiangjiang Qian, Shenzhen (CN); Junping Sun, Beijing (CN); Hengjie Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,664

(22) Filed: Mar. 28, 2019

(65) Prior Publication Data

US 2019/0222532 A1 Jul. 18, 2019

Related U.S. Application Data

(63) Continuation of application No. PCT/CN2017/104064, filed on Sep. 28, 2017.

(30) Foreign Application Priority Data

Sep. 29, 2016 (CN) .......................... 2016 1 0865055

(51) Int. Cl.
*H04L 12/917* (2013.01)
*H04L 27/26* (2006.01)
(Continued)

(52) U.S. Cl.
CPC .............. *H04L 47/76* (2013.01); *H04B 3/54* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS

2007/0064657 A1 3/2007 Wu et al.
2013/0303235 A1 11/2013 Zheng et al.
(Continued)

FOREIGN PATENT DOCUMENTS

| CN | 1937449 A | 3/2007 |
| CN | 1937450 A | 3/2007 |

(Continued)

OTHER PUBLICATIONS

Office Action issued in Chinese Application No. 201610865055.8 dated Nov. 27, 2018, 7 pages.
(Continued)

*Primary Examiner* — Otis L Thompson, Jr.
(74) *Attorney, Agent, or Firm* — Fish & Richardson P.C.

(57) ABSTRACT

This application provides a communications method and device. The communications method includes: determining a first frequency band and a second frequency band in an operating frequency band; and transmitting a first-type frame in the first frequency band, and transmitting a second-type frame in the second frequency band, where the first-type frame is used to carry a first-type service, the second-type frame is used to carry a second-type service, and the second-type frame and the first-type frame have different frame structures. Therefore, in embodiments of the present application, different frame structures are used in different frequency bands in the operating frequency band, and different services are carried by using the different frame structures, thereby meeting transmission requirements of different types of services.

16 Claims, 4 Drawing Sheets

(51) Int. Cl.
  *H04L 12/725* (2013.01)
  *H04L 5/00* (2006.01)
  *H04B 3/54* (2006.01)
(52) U.S. Cl.
  CPC ........ *H04L 5/0064* (2013.01); *H04L 27/2602* (2013.01); *H04L 45/3065* (2013.01); *H04L 5/0044* (2013.01)

(56) References Cited

U.S. PATENT DOCUMENTS

| | | | |
|---|---|---|---|
| 2014/0071954 A1 | 3/2014 | Au et al. | |
| 2016/0050683 A1 | 2/2016 | Gupta et al. | |
| 2016/0353475 A1* | 12/2016 | Au | H04L 5/0055 |
| 2017/0353217 A1* | 12/2017 | Anzinger-Weitmann | B32B 5/00 |
| 2017/0367003 A1* | 12/2017 | Zhang | H04W 88/10 |
| 2018/0324819 A1* | 11/2018 | Liu | H04W 72/0453 |
| 2019/0268885 A1* | 8/2019 | Atungsiri | H04L 25/0202 |
| 2019/0357162 A1* | 11/2019 | You | H04L 5/001 |

FOREIGN PATENT DOCUMENTS

| | | |
|---|---|---|
| CN | 101197655 A | 6/2008 |
| CN | 101212413 A | 7/2008 |
| CN | 102123466 A | 7/2011 |
| CN | 105210448 A | 12/2015 |
| CN | 105407078 A | 3/2016 |
| CN | 105553605 A | 5/2016 |
| CN | 106254038 A | 12/2016 |
| WO | 2016064049 A1 | 4/2016 |

OTHER PUBLICATIONS

Office Action issued in Chinese Application No. 201610865055.8 dated Apr. 26, 2019, 7 pages.
PCT International Search Report and Written Opinion issued in International Application No. PCT/CN2017/104064 dated Dec. 29, 2017, 18 pages (with English translation).
Extended European Search Report issued in European Application No. 17854957.2 dated Aug. 21, 2019, 9 pages.
TD08CI-026—Gigle Semiconductor, "G.hn:Performance and Complexity Analysis of the three current proposals on Power Line for frequencies above 30 MHz," ITU-T Draft; International Telecommunication Union, Study Period 2005-2008, vol. 4/15, Sep. 2008, XP017593131, pp. 1-5.
International Search Report, dated Dec. 29, 2017, in International Application No. PCT/CN2017/104064 (4 pp.).

* cited by examiner

COMMUNICATIONS METHOD AND DEVICE

CROSS-REFERENCE TO RELATED APPLICATIONS

This application is a continuation of International Application No. PCT/CN2017/104064, filed on Sep. 28, 2017, which claims priority to Chinese Patent Application No. 201610865055.8, filed on Sep. 29, 2016. The disclosures of the aforementioned applications are hereby incorporated by reference in their entireties.

TECHNICAL FIELD

This application relates to the communications field, and more specifically, to a communications method and device.

BACKGROUND

A power system includes a power grid and a communications network. The power grid is used for electricity transmission, and the communications network is used for information transmission. As a communications system in which a power distribution terminal transmits information with a master station system, a distribution communications network is mainly used for power distribution system monitoring and controlling, and includes a distribution automation service and an online monitoring service for a distribution grid. The distribution automation service has higher requirements on communication reliability, quality of service (Quality of Service, QoS), and a transmission latency, and the online monitoring service for the distribution grid has a lower requirement on communication QoS and is not that sensitive to a latency.

At present, a frame format supported by a power transmission system is as follows: A subframe length is 5 ms, and one frame includes five subframes. Due to a relatively short frame length in such a frame format, uplink-downlink switching is performed excessively frequently, system overheads are excessively high, and overheads for the uplink-downlink switching account for 20% of a total communication time. Such a frame format is beneficial for the distribution automation service (namely, a latency-sensitive service), but for the online monitoring service (namely, a latency-insensitive service) for the distribution grid, excessively high system overheads are unnecessary.

SUMMARY

This application provides a communications method and device, to support carrying different types of services by using different frame structures, thereby meeting transmission requirements of the different types of services.

According to a first aspect, a communications method is provided. The communications method includes: determining a first frequency band and a second frequency band in an operating frequency band; and transmitting a first-type frame in the first frequency band, and transmitting a second-type frame in the second frequency band, where the first-type frame is used to carry a first-type service, the second-type frame is used to carry a second-type service, and the second-type frame and the first-type frame have different frame structures.

In this solution, different frame structures are used in different frequency bands in the operating frequency band, and different services are carried by using the different frame structures, thereby meeting transmission requirements of different types of services.

With reference to the first aspect, in a possible implementation of the first aspect, sensitivity of the first-type service to a transmission latency is higher than sensitivity of the second-type service to a transmission latency, and a frame length of the first-type frame is less than a frame length of the second-type frame.

In this solution, the frame length of the first-type frame is less than the frame length of the second-type frame. Compared with the second-type frame, for the first-type frame, a shorter uplink-downlink switching period can be obtained, and a transmission latency is lower, so that the first-type frame is applicable to a latency-sensitive service (such as a distribution automation service); and compared with the first-type frame, for the second-type frame, an uplink-downlink switching period is longer, and system overheads are lower, so that the second-type frame is applicable to a latency-insensitive service (such as an online monitoring service for a distribution grid). Therefore, in this application, different frame structures are used in different frequency bands in the operating frequency band, and different services are carried by using the different frame structures, thereby meeting transmission requirements of different types of services.

With reference to the first aspect or some of the foregoing possible implementations, in a possible implementation of the first aspect, the first-type frame includes five subframes, a length of each subframe is 4 ms, and each subframe includes five orthogonal frequency division multiplexing OFDM symbols; the second-type frame includes 15 subframes, a length of each subframe is 8 ms, and each subframe includes 10 OFDM symbols; and a width of each OFDM subcarrier in the first frequency band and the second frequency band is 25/16 kHz.

In this solution, the first-type frame transmitted in the first frequency band has a shorter frame length, to obtain a shorter uplink-downlink switching period, thereby meeting a low-latency requirement of a latency-sensitive service; the second-type frame transmitted in the second frequency band has a longer frame length, to avoid frequent uplink-downlink switching, thereby reducing performance overheads, so that the second-type frame is applicable to a latency-insensitive service. Therefore, according to the communications method provided in this application, requirements of all different types of services can be met. In addition, in this solution, the first frequency band and the second frequency band use a same subcarrier spacing, to facilitate system implementation.

With reference to the first aspect or some of the foregoing possible implementations, in a possible implementation of the first aspect, the first-type frame includes five subframes, a time length of each subframe is 4 ms, and each subframe includes 10 OFDM symbols; the second-type frame includes 15 subframes, a time length of each subframe is 8 ms, and each subframe includes 10 OFDM symbols; and a width of an OFDM subcarrier in the first frequency band is 25/8 kHz, and a width of an OFDM subcarrier in the second frequency band is 25/16 kHz.

With reference to the first aspect or some of the foregoing possible implementations, in a possible implementation of the first aspect, the operating frequency band includes a frequency band authorized to a power system.

In the foregoing implementations, the first-type service is a distribution automation service, and the second-type service is an online monitoring service for a distribution grid.

In this solution, based on a service transmission feature in the power system, supporting of both two frame formats in a power-dedicated frequency band is proposed, to meet transmission requirements of different services in the power system.

With reference to the first aspect or some of the foregoing possible implementations, in a possible implementation of the first aspect, the operating frequency band includes a frequency band that is in a frequency band of 230 MHz and that is authorized to the power system.

With reference to the first aspect or some of the foregoing possible implementations, in a possible implementation of the first aspect, the determining a first frequency band and a second frequency band in an operating frequency band includes: determining 223.525 MHz to 224.650 MHz and 230.525 MHz to 231.650 MHz in the frequency band of 230 MHz, as the first frequency band; and determining 228.075 MHz to 228.750 MHz in the frequency band of 230 MHz, as the second frequency band.

In this solution, based on three clusters (223.525 MHz to 224.650 MHz, 230.525 MHz to 231.650 MHz, and 228.075 MHz to 228.750 MHz) of the frequency band that is in the frequency band of 230 MHz and that is authorized to the power system, two largest clusters are determined as the first frequency band, and the other cluster is determined as the second frequency band, thereby helping meeting a high-bandwidth requirement of a latency-sensitive service.

With reference to the first aspect or some of the foregoing possible implementations, in a possible implementation of the first aspect, the determining a first frequency band and a second frequency band in an operating frequency band includes: determining 228.075 MHz to 228.750 MHz and 230.525 MHz to 231.650 MHz in the frequency band of 230 MHz, as the first frequency band; and determining 223.525 MHz to 224.650 MHz in the frequency band of 230 MHz, as the second frequency band.

In this solution, based on three clusters (223.525 MHz to 224.650 MHz, 230.525 MHz to 231.650 MHz, and 228.075 MHz to 228.750 MHz) of the frequency band that is in the frequency band of 230 MHz and that is authorized to the power system, two clusters that are close to each other are grouped into the first frequency band, and the other cluster is determined as the second frequency band. On one hand, it helps meeting a high-bandwidth requirement of a latency-sensitive service; on the other hand, because the first frequency band is relatively far away from the second frequency band, interference between the first frequency band and the second frequency band can be avoided as much as possible, thereby helping meeting requirements of all different types of services.

With reference to the first aspect or some of the foregoing possible implementations, in a possible implementation of the first aspect, the determining a first frequency band and a second frequency band in an operating frequency band includes: when the first-type service has a first service requirement, determining, as the first frequency band, all frequency bands that are in the frequency band of 230 MHz and that are authorized to the power system, and setting the second frequency band to 0; and when the first-type service has a second service requirement, determining 228.075 MHz to 228.750 MHz and 230.525 MHz to 231.650 MHz in the frequency band of 230 MHz, as the first frequency band, and determining 223.525 MHz to 224.650 MHz in the frequency band of 230 MHz, as the second frequency band.

In this solution, a spectrum range is dynamically adjusted based on a service requirement, to fully meet a low-latency and high-performance service requirement. In addition, spectrum utilization can be improved by using a communications manner with an extensible bandwidth.

With reference to the first aspect or some of the foregoing possible implementations, in a possible implementation of the first aspect, the operating frequency band further includes a frequency band that is in a frequency band of 1.8 GHz and that is authorized to the power system; and the determining a first frequency band and a second frequency band in an operating frequency band includes: determining, as the first frequency band, the frequency band that is in the frequency band of 1.8 GHz and that is authorized to the power system; and determining, as the second frequency band, the frequency band that is in the frequency band of 230 MHz and that is authorized to the power system.

With reference to the first aspect or some of the foregoing possible implementations, in a possible implementation of the first aspect, the first-type frame includes indication information used to indicate a range of the first frequency band.

With reference to the first aspect or some of the foregoing possible implementations, in a possible implementation of the first aspect, the communications method further includes: sending a broadcast message, where the broadcast message includes indication information, and the indication information is used to indicate a range of the first frequency band and/or a range of the second frequency band.

According to a second aspect, a communications device is provided. The communications device is configured to perform the method according to any one of the first aspect or the possible implementations of the first aspect.

Specifically, the communications device may include modules configured to perform the method according to any one of the first aspect or the possible implementations of the first aspect.

According to a third aspect, a communications device is provided. The communications device includes a memory and a processor. The memory is configured to store an instruction. The processor is configured to execute the instruction stored in the memory, and the execution of the instruction stored in the memory enables the processor to perform the method according to any one of the first aspect or the possible implementations of the first aspect.

DESCRIPTION OF EMBODIMENTS

The following describes technical solutions of this application with reference to accompanying drawings.

Figure 1:
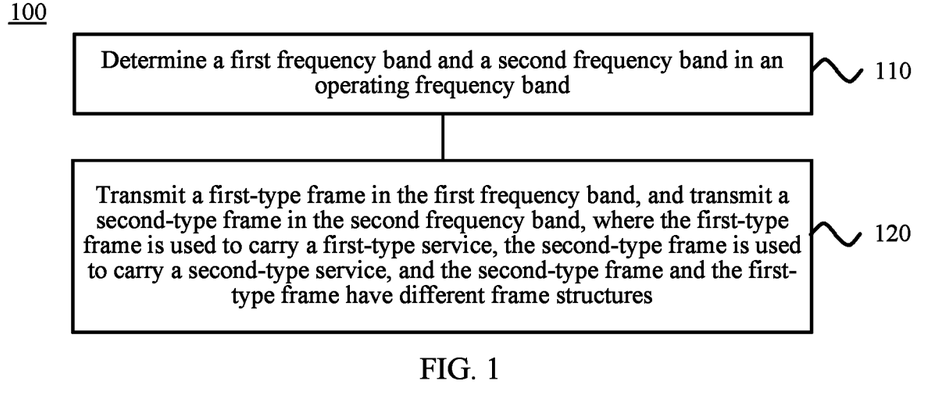
FIG. 1 is a schematic flowchart of a communications method according to an embodiment of the present application.

FIG. 1 is a schematic flowchart of a communications method 100 according to an embodiment of the present application. The communications method 100 may be performed by a base station, and the communications method 100 includes the following steps:

110: Determine a first frequency band and a second frequency band in an operating frequency band.

120: Transmit a first-type frame in the first frequency band, and transmit a second-type frame in the second frequency band, where the first-type frame is used to carry a first-type service, the second-type frame is used to carry a second-type service, and the second-type frame and the first-type frame have different frame structures.

Specifically, that the second-type frame and the first-type frame have different frame structures means that the second-type frame and the first-type frame have different frame lengths, or the second-type frame and the first-type frame have different subframe lengths, or the second-type frame and the first-type frame include different quantities of orthogonal frequency division multiplexing (Orthogonal Frequency Division Multiplexing, OFDM) symbols.

In this embodiment of the present application, the first-type frame may be sent in the first frequency band, and the second frequency band may be sent in the second-type frame. Specifically, the first-type frame and the second-type frame may be sent simultaneously or there may be a particular time difference. This is not limited in this embodiment of the present application.

In this embodiment of the present application, the first-type frame may be received in the first frequency band, and the second-type frame may be received in the second frequency band. Specifically, the first-type frame and the second-type frame may be received simultaneously or there may be a particular time difference. This is not limited in this embodiment of the present application.

Therefore, in this embodiment of the present application, different frame structures are used in different frequency bands of the operating frequency band, and different services are carried by using the different frame structures, thereby meeting transmission requirements of different types of services.

Optionally, in an embodiment, in the embodiment shown in FIG. 1, sensitivity of the first-type service to a transmission latency is higher than sensitivity of the second-type service to a transmission latency, and a frame length of the first-type frame is less than a frame length of the second-type frame.

Specifically, the first-type service is a latency-sensitive service such as a distribution automation service in a power system; and the second-type service is a latency-insensitive service such as an online monitoring service for a distribution grid in the power system.

Optionally, the first-type frame and the second-type frame both operate in Time Division Duplex (TDD) mode. The first-type frame has a shorter frame length than the second-type frame, so that a shorter uplink-downlink switching period is obtained, and a latency is lower. Therefore, the first-type service (namely, a latency-sensitive service) is carried on the first-type frame, and the second-type service (namely, a latency-insensitive service) is carried on the second-type frame, thereby meeting requirements of different types of services.

It should be understood that, in a current technology, only one frame structure can be supported in a same system. For example, in a Long Term Evolution (LTE) system, respective frame structures are designed for frequency division duplex (FDD) and TDD, but frame structures are the same in a same system (such as FDD or TDD). For another example, a control channel and a data channel are designed in a system, but frame structures on the control channel and the data channel are the same.

It can be learned from the foregoing descriptions that, in a scenario with a plurality of services having different latency requirements in a same system, the prior art cannot well meet transmission requirements of all the plurality of services.

In this embodiment of the present application, the operating frequency band is divided into the first frequency band and the second frequency band, the different frame structures are used in the first frequency band and the second frequency band, and different services are carried by using the different frame structures, thereby meeting transmission requirements of different types of services. In addition, according to this embodiment of the present application, transmission requirements of both a latency-sensitive service and a latency-insensitive service can be met with system overheads lower than those in an existing Potevio LTE230 system.

It should be noted that, the latency-sensitive service and the latency-insensitive service mentioned in this embodiment of the present application are both relative concepts. For example, if a latency requirement index of a first service is 10 ms, a latency requirement index of a second service is 20 ms, and a latency requirement index of a third service is, relative to the first service, the second service is a latency-insensitive service, but relative to the third service, the second service is a latency-sensitive service.

Optionally, in an embodiment, in the embodiment shown in FIG. 1, the first-type frame includes five subframes, a length of each subframe is 4 ms, and each subframe includes five orthogonal frequency division multiplexing OFDM symbols; the second-type frame includes 15 subframes, a length of each subframe is 8 ms, and each subframe includes 10 OFDM symbols; and a width of each OFDM subcarrier in the first frequency band and the second frequency band is 25/16 kHz.

It should be understood that, the width of each OFDM subcarrier in the first frequency band and the second frequency band is 25/16 kHz.

In this embodiment of the present application, the first-type frame transmitted in the first frequency band has a shorter frame length, to obtain a shorter uplink-downlink switching period, thereby meeting a low-latency requirement of a latency-sensitive service; and the second-type frame transmitted in the second frequency band has a longer frame length, to avoid frequent uplink-downlink switching, thereby improving transmission efficiency and reducing system overheads, so that the second-type frame is applicable to a latency-insensitive service. Therefore, the communications method provided in this embodiment of the present application can well meet requirements of all different types of services.

In addition, in this embodiment of the present application, the first frequency band and the second frequency band use a same subcarrier spacing, to facilitate system implementation.

Optionally, in an embodiment, in the embodiment shown in FIG. 1, the first-type frame includes five subframes, a time length of each subframe is 4 ms, and each subframe includes 10 OFDM symbols; the second-type frame includes 15 subframes, a time length of each subframe is 8 ms, and each subframe includes 10 OFDM symbols; and a width of an OFDM subcarrier in the first frequency band is 25/8 kHz, and a width of an OFDM subcarrier in the second frequency band is 25/16 kHz.

It should be understood that, the width of each OFDM subcarrier in the first frequency band is greater than the width of each OFDM subcarrier in the second frequency band, and correspondingly, a length of a corresponding OFDM symbol in the first frequency band is less than a length of a corresponding OFDM symbol in the second frequency band, so that the first-type frame transmitted in the first frequency band has a lower latency, and the second-type frame transmitted in the second frequency band has a higher latency. Therefore, the first-type service is carried on the first-type frame, to help meet a low-latency requirement of a latency-sensitive service. In addition, the width of each OFDM subcarrier in the second frequency band is less than the width of each OFDM subcarrier in the first frequency band. It should be understood that, at same transmit power, a narrower subcarrier can be transmitted over a longer distance on a same OFDM symbol. To be specific, the second frequency band has wider coverage than the first frequency band, and more users can be supported in a cell. Therefore, the second-type service is carried on the second type frame, to meet a wide-coverage requirement of a latency-insensitive service.

Optionally, in an embodiment, in the embodiment shown in FIG. 1, the operating frequency band includes a frequency band authorized to a power system.

For ease of description and understanding, the frequency band authorized to the power system is denoted as a power-dedicated frequency band in this specification.

Specifically, in a scenario of the power system, for example, the first-type service is a distribution automation service, and such a type of service has a high requirement on a latency; and the second-type service is an online monitoring service for a distribution grid, and such a type of service has a low requirement on a latency.

In this embodiment of the present application, based on a service transmission feature in the power system, both two frame formats are supported in the power-dedicated frequency band, to meet a service transmission requirement in the power system. Specifically, in the power-dedicated frequency band, both a transmission requirement of the distribution automation service and a transmission requirement of the online monitoring service for the distribution grid can be met.

Optionally, in an embodiment, in the embodiment shown in FIG. 1, the operating frequency band includes a frequency band that is in a frequency band of 230 MHz and that is authorized to the power system.

Figure 2:
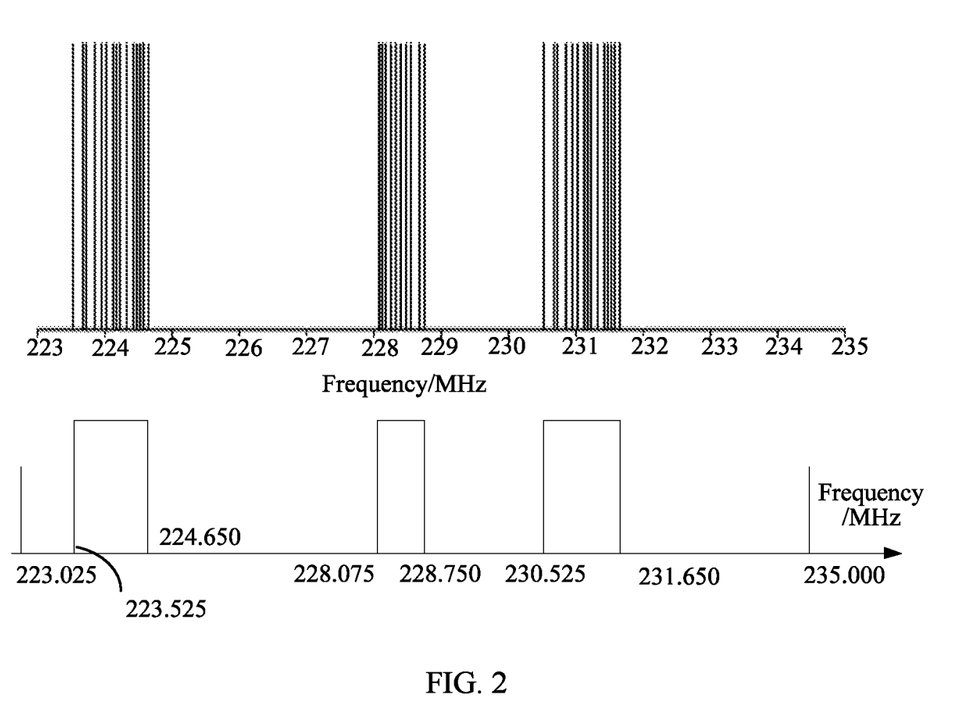
FIG. 2 is a schematic diagram of an operating frequency band according to an embodiment of the present application.

Specifically, as shown in FIG. 2, a range of the frequency band of 230 MHz is 223.525 MHz to 231.650 MHz, and if the frequency band of 230 MHz is allocated by using a bandwidth of 25 kHz as a frequency, there are 480 frequencies in total. 40 frequencies in the 480 frequencies in the frequency band of 230 MHz are classified as power-dedicated frequencies, and the 40 power-dedicated frequencies (1 MHz in total) are scattered in the 480 frequencies. Specifically, the 40 power-dedicated frequencies are shown in Table 1 and Table 2.

TABLE 1

| Category | Frequency group | Frequency code | Transmit frequency (MHz) |
|---|---|---|---|
| Single-frequency network | F1 | F1-3 | 228.075 |
| | | F1-5 | 228.125 |
| | | F1-7 | 228.175 |
| | | F1-10 | 228.250 |
| | | F1-13 | 228.325 |
| | | F1-16 | 228.400 |
| | | F1-19 | 228.475 |
| | | F1-22 | 228.550 |
| | | F1-27 | 228.675 |
| | | F1-30 | 228.750 |

TABLE 2

| Category | Frequency group | Frequency code | Transmit frequency (MHz) Master station | Transmit frequency (MHz) Slave station |
|---|---|---|---|---|
| Dual-frequency network | F3 | F3-21 | 230.525 | 223.525 |
| | | F3-27 | 230.675 | 223.675 |
| | | F3-29 | 230.725 | 223.725 |
| | | F3-34 | 230.850 | 223.850 |
| | | F3-38 | 230.950 | 223.950 |
| | | F3-41 | 231.025 | 224.025 |
| | | F3-45 | 231.125 | 224.125 |
| | | F3-47 | 231.175 | 224.175 |
| | | F3-49 | 231.225 | 224.225 |
| | F4 | F4-3 | 231.325 | 224.325 |
| | | F4-7 | 231.425 | 224.425 |
| | | F4-9 | 231.475 | 224.475 |
| | | F4-11 | 231.525 | 224.525 |
| | | F4-13 | 231.575 | 224.575 |
| | | F4-16 | 231.650 | 224.650 |

It can be learned from FIG. 2 and Table 1 and Table 2 that, the frequency band that is in the frequency band of 230 MHz and that is authorized to the power system is basically divided into three clusters: 223.525 MHz to 224.650 MHz, 228.075 MHz to 228.750 MHz, and 230.525 MHz to 231.650 MHz.

Optionally, in an embodiment, in the embodiment shown in FIG. 1, 110 of determining a first frequency band and a second frequency band in an operating frequency band includes:

determining 223.525 MHz to 224.650 MHz and 230.525 MHz to 231.650 MHz in the frequency band of 230 MHz, as the first frequency band; and determining 228.075 MHz to 228.750 MHz in the frequency band of 230 MHz, as the second frequency band.

Figure 3:
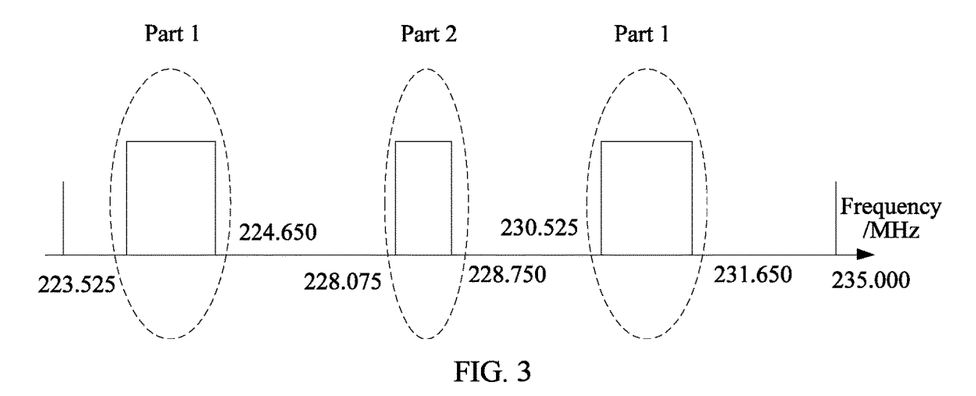
FIG. 3 is a schematic diagram of division of a first frequency band and a second frequency band according to an embodiment of the present application.

Specifically, the first frequency band is a frequency band shown in "Part 1" in FIG. 3, and the second frequency band is a frequency band shown in "Part 2" in FIG. 3.

It should be understood that, in an embodiment shown in FIG. 3, a first-type frame transmitted in a first frequency band may have the frame structure of the first-type frame described in the foregoing embodiment; and a second-type frame transmitted in a second frequency band may have the frame structure of the second-type frame described in the foregoing embodiment. For brevity, details are not described herein again.

In this embodiment of the present application, based on three clusters (223.525 MHz to 224.650 MHz, 230.525 MHz to 231.650 MHz, and 228.075 MHz to 228.750 MHz) of the frequency band that is in the frequency band of 230 MHz and that is authorized to the power system, two largest clusters are determined as the first frequency band, and the other cluster is determined as the second frequency band, thereby helping meeting a high-bandwidth requirement of a latency-sensitive service.

Optionally, in an embodiment, in the embodiment shown in FIG. 1, 110 of determining a first frequency band and a second frequency band in an operating frequency band includes: determining 228.075 MHz to 228.750 MHz and 230.525 MHz to 231.650 MHz in the frequency band of 230 MHz, as the first frequency band; and determining 223.525 MHz to 224.650 MHz in the frequency band of 230 MHz, as the second frequency band.

Figure 4:
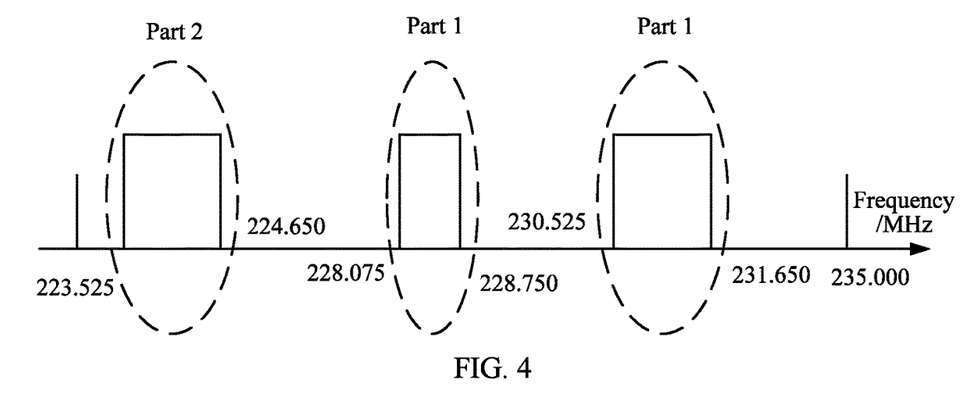
FIG. 4 is another schematic diagram of division of a first frequency band and a second frequency band according to an embodiment of the present application.

Specifically, the first frequency band is a frequency band shown in "Part 1" in FIG. 4, and the second frequency band is a frequency band shown in "Part 2" in FIG. 4.

It should be understood that, in an embodiment shown in FIG. 4, a first-type frame transmitted in a first frequency band may have the frame structure of the first-type frame described in the foregoing embodiment; and a second-type frame transmitted in a second frequency band may have the frame structure of the second-type frame described in the foregoing embodiment. For brevity, details are not described herein again.

In this embodiment of the present application, based on three clusters (223.525 MHz to 224.650 MHz, 230.525 MHz to 231.650 MHz, and 228.075 MHz to 228.750 MHz) of the frequency band that is in the frequency band of 230 MHz and that is authorized to the power system, two clusters that are close to each other are grouped into the first frequency band, and the other cluster is determined as the second frequency band. On one hand, it helps meeting a high-bandwidth requirement of a latency-sensitive service; on the other hand, because the first frequency band is relatively far away from the second frequency band, interference between the first frequency band and the second frequency band can be avoided as much as possible, thereby helping meeting requirements of all different types of services.

In some cities, China Power obtains the right of use of a frequency band of 1.8 GHz. In this case, a latency-sensitive service is to be transmitted in the frequency band of 1.8 GHz, and the entire idle frequency band of 230 MHz is used by a latency-insensitive service.

Optionally, in an embodiment, in the embodiment shown in FIG. 1, the operating frequency band includes the frequency band that is in the frequency band of 230 MHz and that is authorized to the power system and a frequency band that is in a frequency band of 1.8 GHz and that is authorized to the power system; and 110 of determining a first frequency band and a second frequency band in an operating frequency band includes:

determining, as the first frequency band, the frequency band that is in the frequency band of 1.8 GHz and that is authorized to the power system; and determining, as the second frequency band, the frequency band that is in the frequency band of 230 MHz and that is authorized to the power system.

In this embodiment of the present application, the first frequency band and the second frequency band can be dynamically determined.

Optionally, in an embodiment, when the first-type service has a first service requirement, all frequency bands that are in the frequency band of 230 MHz and that are authorized to the power system are determined as the first frequency band, and the second frequency band is set to 0; and when the first-type service has a second service requirement, 228.075 MHz to 228.750 MHz and 230.525 MHz to 231.650 MHz in the frequency band of 230 MHz are determined as the first frequency band, and 223.525 MHz to 224.650 MHz in the frequency band of 230 MHz is determined as the second frequency band.

Figure 5:
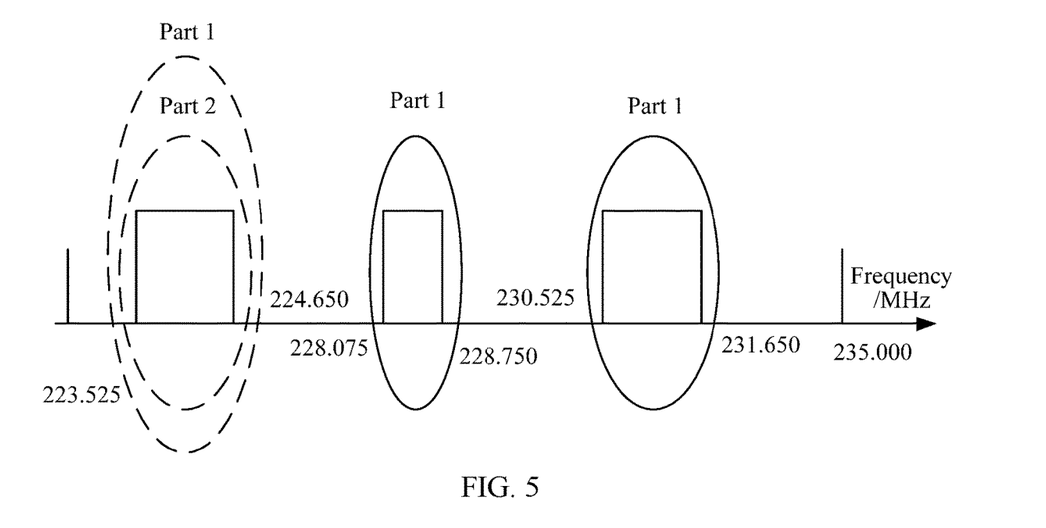
FIG. 5 is still another schematic diagram of division of a first frequency band and a second frequency band according to an embodiment of the present application.

Specifically, as shown in FIG. 5, when the first-type service has the first service requirement, a part shown by a solid line in FIG. 5 and "Part 1" shown by a dashed line are determined as the first frequency band, to be specific, all the frequency bands that are in the frequency band of 230 MHz and that are authorized to the power system are used as the first frequency band, and a range of the second frequency band is 0. When the first-type service has the second service requirement, "Part 1" shown by a solid line in FIG. 5 is determined as the first frequency band, and "Part 2" shown by a dashed line in FIG. 5 is determined as the second frequency band.

It should be understood that, in this embodiment, the first service requirement is, for example, a service requirement that a service requirement index exceeding a threshold, and the second service requirement is a service requirement not exceeding a threshold. The threshold may be preset by a system.

Therefore, in this embodiment of the present application, a spectrum range is dynamically adjusted based on a service requirement, to fully meet a low-latency and high-performance service requirement.

A method provided in an embodiment shown in FIG. 5 may be referred to as a communications manner with an extensible bandwidth, to improve spectrum utilization.

It should be understood that, FIG. 5 is merely an example but is not for limitation. During actual application, ranges of the first frequency band and the second frequency band may be dynamically adjusted based on a service requirement of the first-type service, and this is not limited to the method shown in FIG. 5. For example, in the first service requirement of the first-type service, the first frequency band and the second frequency band are determined based on the embodiment shown in FIG. 3; and in the second service requirement of the first-type service, the first frequency band and the second frequency band are determined based on the embodiment shown in FIG. 4.

In an embodiment, if the right of use of the frequency band of 1.8 GHz is not obtained, 228.075 MHz to 228.750 MHz and 230.525 MHz to 231.650 MHz in the frequency band of 230 MHz are determined as the first frequency band, and 223.525 MHz to 224.650 MHz in the frequency band of 230 MHz is determined as the second frequency band. If the right of use of the frequency band of 1.8 GHz is obtained, the frequency band that is in the frequency band of 1.8 GHz and that is authorized to the power system is determined as the first frequency band, and the frequency band that is in the frequency band of 230 MHz and that is authorized to the power system is determined as the second frequency band.

Figure 6:
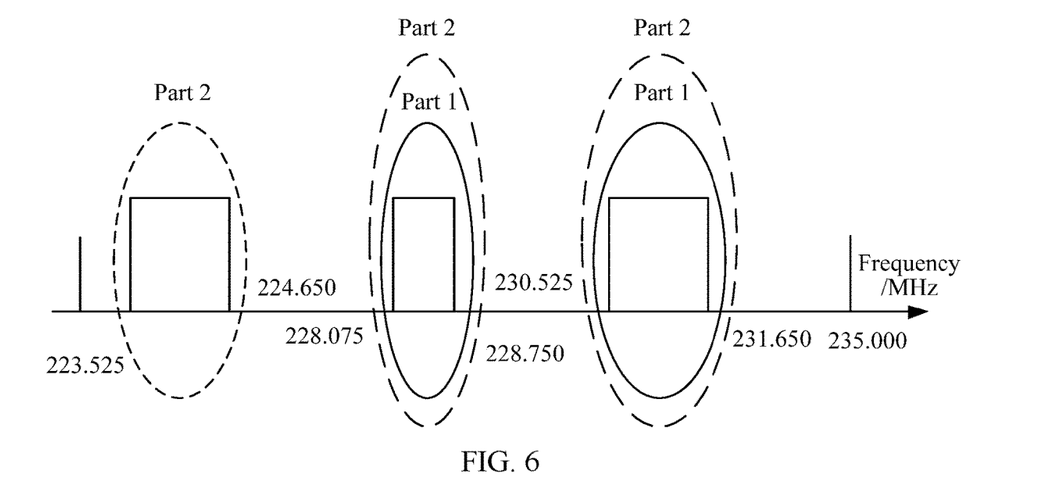
FIG. 6 is still another schematic diagram of division of a first frequency band and a second frequency band according to an embodiment of the present application.

Specifically, as shown in FIG. 6, if the right of use of the frequency band of 1.8 GHz is not obtained, "Part 1" shown by a solid line in FIG. 6 is determined as the first frequency band, and "Part 2" shown by a solid line in FIG. 6 is determined as the second frequency band. If the right of use of the frequency band of 1.8 GHz is obtained, both "Part 2" shown by a solid line and "Part 2" shown by a dashed line in FIG. 6 are determined as the second frequency band, and the frequency band that is in the frequency band of 1.8 GHz and that is authorized to the power system is determined as the first frequency band.

In this embodiment of the present application, the first frequency band and the second frequency band are dynamically adjusted based on an obtaining status of a spectrum resource, to provide a more proper spectrum resource to a latency-sensitive service.

It should be further understood that, FIG. 6 is merely an example but is not for limitation. During actual application, the first frequency band and the second frequency band may be appropriately adjusted according to a specific situation. This is not limited in this embodiment of the present application.

In this embodiment of the present application, the range of the first frequency band and/or the range of the second frequency band may be indicated through broadcast or by adding indication information to a frame.

Optionally, in an embodiment, the first-type frame includes indication information, and the indication information indicates a range of the first frequency band.

Specifically, when the indication information is a first identifier (for example, 1), the indication information indicates that the first frequency band is 223.525 MHz to 224.650 MHz (a first cluster for short below) and 230.525 MHz to 231.650 MHz (a third cluster for short below) in the frequency band of 230 MHz; when the indication information is a second identifier (for example, 2), the indication information indicates that the first frequency band is 228.075 MHz to 228.750 MHz (a second cluster for short below) and the third cluster; when the indication information is a third identifier (for example, 3), the indication information indicates that the first frequency band is the first cluster and the second cluster; when the indication information is a fourth identifier (for example, 4), the indication information indicates that the first frequency band is all the frequency bands (namely, the first cluster, the second cluster, and the third cluster) that are in the frequency band of 230 MHz and that are authorized to the power system; and when the indication information is a fifth identifier (for example, 5), the indication information indicates that the first frequency band is the frequency band that is in the frequency band of 1.8 GHz and that is authorized to the power system.

Optionally, the second-type frame may also include indication information used to indicate the range of the second frequency band.

Optionally, in an embodiment, the communications method further includes: sending a broadcast message, where the broadcast message includes indication information, and the indication information is used to indicate a range of the first frequency band and/or a range of the second frequency band.

Specifically, for example, when the indication information is a first identifier (for example, 1), the indication information indicates that the first frequency band is a first cluster and a third cluster, and the second frequency band is a second cluster; when the indication information is a second identifier (for example, 2), the indication information indicates that the first frequency band is the second cluster and the third cluster, and the second frequency band is the first cluster; when the indication information is a third identifier (for example, 3), the indication information indicates that the first frequency band is the first cluster and the second cluster, and the second frequency band is the third cluster; when the indication information a fourth identifier (for example, 4), the indication information indicates that the first frequency band is all the frequency bands that are in the frequency band of 230 MHz and that are authorized to the power system, and the range of the second frequency band is 0; and when the indication information is a fifth identifier (for example, 5), the indication information indicates that the first frequency band is the frequency band that is in the frequency band of 1.8 GHz and that is authorized to the power system, and the second frequency band is the frequency band that is in the frequency band of 230 MHz and that is authorized to the power system.

In conclusion, in this embodiment of the present application, different frame structures are used in different frequency bands in the operating frequency band, and different services are carried by using the different frame structures, thereby meeting transmission requirements of different types of services.

It should be understood that, an example in which an application scenario of the embodiments of the present application is the power system is used for description above, and the embodiments of the present application are not limited thereto. The communications method provided in the embodiments of the present application is further applicable to a communications scenario in which there are different services having different latency requirements in a same system.

It should be further understood that, the foregoing embodiments may be performed by any communications device, and the steps in the embodiment shown in FIG. 1 may be performed by a transmit end device or may be performed by a receive end device.

The communications method in the embodiments of the present application is described above with reference to FIG. 1 to FIG. 6, and a communications device in an embodiment of the present application is described below with reference to FIG. 7 and FIG. 8.

Figure 7:
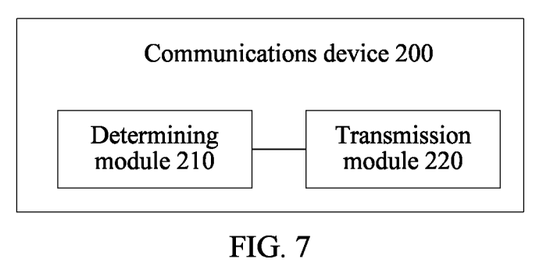
FIG. 7 is a schematic block diagram of a communications device according to an embodiment of the present application.

FIG. 7 is a schematic block diagram of a communications device 200 according to an embodiment of the present application. The communications device 200 includes:

a determining module 210, configured to determine a first frequency band and a second frequency band in an operating frequency band; and a transmission module 220, configured to: transmit a first-type frame in the first frequency band determined by the determining module, and transmit a second-type frame in the second frequency band determined by the determining module, where the first-type frame is used to carry a first-type service, the second-type frame is used to carry a second-type service, and the second-type frame and the first-type frame have different frame structures.

Therefore, in this embodiment of the present application, different frame structures are used in different frequency bands in the operating frequency band, and different services are carried by using the different frame structures, thereby meeting transmission requirements of different types of services.

Optionally, in an embodiment, sensitivity of the first-type service to a transmission latency is higher than sensitivity of the second-type service to a transmission latency, and a frame length of the first-type frame is less than a frame length of the second-type frame.

Optionally, in an embodiment, the first-type frame includes five subframes, a length of each subframe is 4 ms, and each subframe includes five orthogonal frequency division multiplexing OFDM symbols; the second-type frame includes 15 subframes, a length of each subframe is 8 ms, and each subframe includes 10 OFDM symbols; and a width of each OFDM subcarrier in the first frequency band and the second frequency band is 25/16 kHz.

Optionally, in an embodiment, the first-type frame includes five subframes, a time length of each subframe is 4 ms, and each subframe includes 10 OFDM symbols; the second-type frame includes 15 subframes, a time length of each subframe is 8 ms, and each subframe includes 10 OFDM symbols; and a width of an OFDM subcarrier in the first frequency band is 25/8 kHz, and a width of an OFDM subcarrier in the second frequency band is 25/16 kHz.

Optionally, in an embodiment, the operating frequency band includes a frequency band authorized to a power system.

Optionally, in an embodiment, the operating frequency band includes a frequency band that is in a frequency band of 230 MHz and that is authorized to the power system.

Optionally, in an embodiment, the determining module 210 is configured to: determine 223.525 MHz to 224.650 MHz and 230.525 MHz to 231.650 MHz in the frequency band of 230 MHz, as the first frequency band; and determine 228.075 MHz to 228.750 MHz in the frequency band of 230 MHz, as the second frequency band.

Optionally, in an embodiment, the determining module 210 is configured to: determine 228.075 MHz to 228.750 MHz and 230.525 MHz to 231.650 MHz in the frequency band of 230 MHz, as the first frequency band; and determine 223.525 MHz to 224.650 MHz in the frequency band of 230 MHz, as the second frequency band.

Optionally, in an embodiment, the determining module 210 is configured to: when the first-type service has a first service requirement, determine, as the first frequency band, all frequency bands that are in the frequency band of 230 MHz and that are authorized to the power system, and set the second frequency band to 0; and when the first-type service has a second service requirement, determine 228.075 MHz to 228.750 MHz and 230.525 MHz to 231.650 MHz in the frequency band of 230 MHz, as the first frequency band, and determine 223.525 MHz to 224.650 MHz in the frequency band of 230 MHz, as the second frequency band.

Optionally, in an embodiment, the operating frequency band further includes a frequency band that is in a frequency band of 1.8 GHz and that is authorized to the power system; and the determining module 210 is configured to: determine, as the first frequency band, the frequency band that is in the frequency band of 1.8 GHz and that is authorized to the power system; and determine, as the second frequency band, the frequency band that is in the frequency band of 230 MHz and that is authorized to the power system.

Optionally, in an embodiment, the first-type frame includes indication information used to indicate a range of the first frequency band.

Optionally, in an embodiment, the transmission module 220 is further configured to send a broadcast message, where the broadcast message includes indication information, and the indication information is used to indicate a range of the first frequency band and/or a range of the second frequency band.

It should be understood that, the communications device 200 in this embodiment of the present application may be configured to perform the communications method in the foregoing embodiments, and the foregoing and other operations and/or functions of the modules in the communications device 200 are respectively for implementing corresponding procedures in the methods in FIG. 1 to FIG. 6. For brevity, details are not described herein again.

It should be further understood that, the determining module 210 may be executed by a processor of the communications device 200 or a related circuit component of a processor, and the transmission module 220 may be executed by a transceiver of the communications device 200 or a related circuit component of a transceiver.

Figure 8:
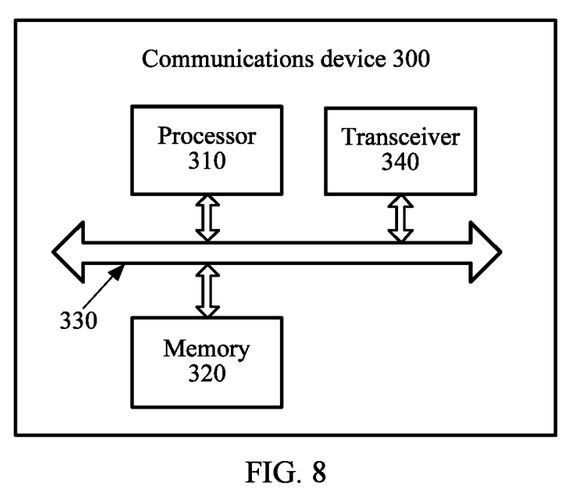
FIG. 8 is another schematic block diagram of a communications device according to an embodiment of the present application.

As shown in FIG. 8, an embodiment of the present application further provides a network device 300. The network device 300 includes a processor 310, a memory 320, a bus system 330, and a transceiver 340. The processor 310, the memory 320, and the transceiver 340 are connected to each other by using the bus system 330. The memory 320 is configured to store an instruction. The processor 310 is configured to execute the instruction stored in the memory 320, to control the transceiver 340 to receive a signal and/or send a signal. The processor 310 is configured to determine a first frequency band and a second frequency band in an operating frequency band. The transceiver 340 is configured to: transmit a first-type frame in the first frequency band, and transmit a second-type frame in the second frequency band, where the first-type frame is used to carry a first-type service, the second-type frame is used to carry a second-type service, and the second-type frame and the first-type frame have different frame structures.

Therefore, in this embodiment of the present application, different frame structures are used in different frequency bands in the operating frequency band, and different services are carried by using the different frame structures, thereby meeting transmission requirements of different types of services.

Optionally, in an embodiment, sensitivity of the first-type service to a transmission latency is higher than sensitivity of the second-type service to a transmission latency, and a frame length of the first-type frame is less than a frame length of the second-type frame.

Optionally, in an embodiment, the first-type frame includes five subframes, a length of each subframe is 4 ms, and each subframe includes five orthogonal frequency division multiplexing OFDM symbols; the second-type frame includes 15 subframes, a length of each subframe is 8 ms, and each subframe includes 10 OFDM symbols; and a width of each OFDM subcarrier in the first frequency band and the second frequency band is 25/16 kHz.

Optionally, in an embodiment, the first-type frame includes five subframes, a time length of each subframe is 4 ms, and each subframe includes 10 OFDM symbols; the second-type frame includes 15 subframes, a time length of each subframe is 8 ms, and each subframe includes 10 OFDM symbols; and a width of an OFDM subcarrier in the first frequency band is 25/8 kHz, and a width of an OFDM subcarrier in the second frequency band is 25/16 kHz.

Optionally, in an embodiment, the operating frequency band includes a frequency band authorized to a power system.

Optionally, in an embodiment, the operating frequency band includes a frequency band that is in a frequency band of 230 MHz and that is authorized to the power system.

Optionally, in an embodiment, the processor 310 is configured to: determine 223.525 MHz to 224.650 MHz and 230.525 MHz to 231.650 MHz in the frequency band of 230 MHz, as the first frequency band; and determine 228.075 MHz to 228.750 MHz in the frequency band of 230 MHz, as the second frequency band.

Optionally, in an embodiment, the processor 310 is configured to: determine 228.075 MHz to 228.750 MHz and 230.525 MHz to 231.650 MHz in the frequency band of 230 MHz, as the first frequency band; and determine 223.525 MHz to 224.650 MHz in the frequency band of 230 MHz, as the second frequency band.

Optionally, in an embodiment, the processor 310 is configured to: when the first-type service has a first service requirement, determine, as the first frequency band, all frequency bands that are in the frequency band of 230 MHz and that are authorized to the power system, and set the second frequency band to 0; and when the first-type service has a second service requirement, determine 228.075 MHz to 228.750 MHz and 230.525 MHz to 231.650 MHz in the frequency band of 230 MHz, as the first frequency band, and determine 223.525 MHz to 224.650 MHz in the frequency band of 230 MHz, as the second frequency band.

Optionally, in an embodiment, the operating frequency band further includes a frequency band that is in a frequency band of 1.8 GHz and that is authorized to the power system; and the processor 310 is configured to: determine, as the first frequency band, the frequency band that is in the frequency band of 1.8 GHz and that is authorized to the power system; and determine, as the second frequency band, the frequency band that is in the frequency band of 230 MHz and that is authorized to the power system.

Optionally, in an embodiment, the first-type frame includes indication information used to indicate a range of the first frequency band.

Optionally, in an embodiment, the transceiver 340 is configured to send a broadcast message, where the broadcast message includes indication information, and the indication information is used to indicate a range of the first frequency band and/or a range of the second frequency band.

It should be understood that in this embodiment of the present application, the processor 310 may be a central processing unit (Central Processing Unit, "CPU" for short), or the processor 310 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 320 may include a read-only memory and a random access memory, and provide an instruction and data to the processor 310. A part of the memory 320 may further include a non-volatile random access memory. For example, the memory 320 may further store information of a device type.

The bus system 330 may further include a power bus, a control bus, a status signal bus, and the like, in addition to a data bus. However, for clear description, various types of buses in the figure are marked as the bus system 330.

In an implementation process, steps in the foregoing methods can be implemented by using a hardware integrated logical circuit in the processor 310, or by using instructions in a form of software. The steps of the method disclosed with reference to the embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 320, and a processor 310 reads information in the memory 320 and completes the steps in the foregoing methods in combination with hardware of the processor. To avoid repetition, details are not described herein again.

It should be further understood that, the transceiver 340 may indicate a component having receiving and sending functions, or may include an independent receiver and an independent transmitter.

It should be further understood that, the communications device 300 according to this embodiment of the present application may be configured to perform the method embodiments described above with reference to FIG. 1 to FIG. 6, the communications device 300 may correspond to the communications device 200 according to the embodiments of the present application, and the foregoing and other operations and/or functions of the modules in the communications device 300 are respectively for implementing corresponding procedures in the methods in FIG. 1 to FIG. 6. For brevity, details are not described herein again.

It should be further understood that, the numbers used in this specification are merely for distinguishing for convenience of description, and are not intended to limit the scope of the embodiments of the present application.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, comprising:
   determining a first frequency band and a second frequency band in an operating frequency band; and
   transmitting a first-type frame in the first frequency band, and transmitting a second-type frame in the second frequency band, wherein the first-type frame is used to carry a first-type service, the second-type frame is used to carry a second-type service, and the second-type frame and the first-type frame have different frame structures, and wherein:
   the first-type frame comprises five subframes, and a time length of each subframe of the first-type frame is 4 ms;
   the second-type frame comprises fifteen subframes, a time length of each subframe of the second-type frame is 8 ms, and each subframe of the second-type frame comprises ten orthogonal frequency division multiplexing (OFDM) symbols; and
   each subframe of the first-type frame comprises five OFDM symbols, and a width of each OFDM subcarrier in the first frequency band and the second frequency band is 25/16 kHz; or
   each subframe of the first-type frame comprises ten OFDM symbols, a width of an OFDM subcarrier in the first frequency band is 25/8 kHz, and a width of an OFDM subcarrier in the second frequency band is 25/16 kHz.

2. The communications method according to claim 1, wherein sensitivity of the first-type service to a transmission latency is higher than sensitivity of the second-type service to a transmission latency, and a frame length of the first-type frame is less than a frame length of the second-type frame.

3. The communications method according to claim 1, wherein the operating frequency band comprises a frequency band authorized to a power system.

4. The communications method according to claim 3, wherein the operating frequency band comprises a frequency band that is in a frequency band of 230 MHz and that is authorized to the power system.

5. The communications method according to claim 4, wherein the determining a first frequency band and a second frequency band in an operating frequency band comprises:
   determining 223.525 MHz to 224.650 MHz and 230.525 MHz to 231.650 MHz in the frequency band of 230 MHz, as the first frequency band; and
   determining 228.075 MHz to 228.750 MHz in the frequency band of 230 MHz, as the second frequency band.

6. The communications method according to claim 4, wherein the determining a first frequency band and a second frequency band in an operating frequency band comprises:
   determining 228.075 MHz to 228.750 MHz and 230.525 MHz to 231.650 MHz in the frequency band of 230 MHz, as the first frequency band; and
   determining 223.525 MHz to 224.650 MHz in the frequency band of 230 MHz, as the second frequency band.

7. The communications method according to claim 4, wherein the determining a first frequency band and a second frequency band in an operating frequency band comprises:
   when the first-type service has a first service requirement, determining, as the first frequency band, all frequency bands that are in the frequency band of 230 MHz and that are authorized to the power system, and setting the second frequency band to 0; and
   when the first-type service has a second service requirement, determining 228.075 MHz to 228.750 MHz and 230.525 MHz to 231.650 MHz in the frequency band of 230 MHz, as the first frequency band, and determining 223.525 MHz to 224.650 MHz in the frequency band of 230 MHz, as the second frequency band.

8. The communications method according to claim 4, wherein the operating frequency band further comprises a frequency band that is in a frequency band of 1.8 GHz and that is authorized to the power system; and
   the determining a first frequency band and a second frequency band in an operating frequency band comprises:
   determining, as the first frequency band, the frequency band that is in the frequency band of 1.8 GHz and that is authorized to the power system; and
   determining, as the second frequency band, the frequency band that is in the frequency band of 230 MHz and that is authorized to the power system.

9. The communications method according to claim 1, wherein the first-type frame comprises indication information used to indicate a range of the first frequency band.

10. The communications method according to claim 1, wherein the communications method further comprises:
    sending a broadcast message, wherein the broadcast message comprises indication information, and the indication information is used to indicate at least one of a range of the first frequency band or a range of the second frequency band.

11. A communications device, comprising:
    at least one processor, the at least one processor configured to determine a first frequency band and a second frequency band in an operating frequency band; and
    a e transmitter, the transmitter configured to: transmit a first-type frame in the first frequency band, and transmit a second-type frame in the second frequency band, wherein the first-type frame is used to carry a first-type service, the second-type frame is used to carry a second-type service, and the second-type frame and the first-type frame have different frame structures, and wherein:
    the first-type frame comprises five subframes, and a time length of each subframe of the first-type frame is 4 ms;
    the second-type frame comprises fifteen subframes, a time length of each subframe of the second-type frame is 8 ms, and each subframe of the second-type frame comprises ten orthogonal frequency division multiplexing (OFDM) symbols; and each subframe of the first-type frame comprises five OFDM symbols, and a width of each OFDM subcarrier in the first frequency band and the second frequency band is 25/16 kHz; or each subframe of the first-type frame comprises ten OFDM symbols, a width of an OFDM subcarrier in the first frequency band is 25/8 kHz, and a width of an OFDM subcarrier in the second frequency band is 25/16 kHz.

12. The communications device according to claim 11, wherein sensitivity of the first-type service to a transmission latency is higher than sensitivity of the second-type service to a transmission latency, and a frame length of the first-type frame is less than a frame length of the second-type frame.

13. The communications device according to claim 11, wherein the operating frequency band comprises a frequency band authorized to a power system.

14. The communications device according to claim 13, wherein the operating frequency band comprises a frequency band that is in a frequency band of 230 MHz and that is authorized to the power system.

15. The communications device according to claim 14, wherein the at least one processor is configured to: determine 223.525 MHz to 224.650 MHz and 230.525 MHz to 231.650 MHz in the frequency band of 230 MHz, as the first frequency band; and determine 228.075 MHz to 228.750 MHz in the frequency band of 230 MHz, as the second frequency band.

16. The communications device according to claim 14, wherein the at least one processor is configured to: determine 228.075 MHz to 228.750 MHz and 230.525 MHz to 231.650 MHz in the frequency band of 230 MHz, as the first frequency band; and determine 223.525 MHz to 224.650 MHz in the frequency band of 230 MHz, as the second frequency band.

* * * * *

UNITED STATES PATENT AND TRADEMARK OFFICE
CERTIFICATE OF CORRECTION

PATENT NO. : 10,834,016 B2
APPLICATION NO. : 16/368664
DATED : November 10, 2020
INVENTOR(S) : Yalin Liu et al.

Page 1 of 1

It is certified that error appears in the above-identified patent and that said Letters Patent is hereby corrected as shown below:

In the Claims

In Column 18, Line 53, Claim 11, delete "e transmitter," and insert -- transmitter, --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*